(12) United States Patent
Kortge

(10) Patent No.: US 6,446,068 B1
(45) Date of Patent: Sep. 3, 2002

(54) SYSTEM AND METHOD OF FINDING NEAR NEIGHBORS IN LARGE METRIC SPACE DATABASES

(75) Inventor: Chris Alan Kortge, 6432 Williams Ridge Way, Austin, TX (US) 78731

(73) Assignee: Chris Alan Kortge, Austin, TX (US)

( * ) Notice: Subject to any disclaimer, the term of this patent is extended or adjusted under 35 U.S.C. 154(b) by 0 days.

(21) Appl. No.: 09/441,158

(22) Filed: Nov. 15, 1999

(51) Int. Cl.$^7$ ................................................ G06F 17/30
(52) U.S. Cl. ................ 707/6; 707/4; 707/5; 707/104.1; 382/106; 382/159; 382/209; 382/225
(58) Field of Search ................ 707/6, 1, 2, 3, 707/4, 5, 104.1; 382/106, 159, 181, 209, 229, 225

(56) References Cited

U.S. PATENT DOCUMENTS

| | | | |
|---|---|---|---|
| 5,848,404 A | | 12/1998 | Hafner et al. |
| 5,884,320 A | | 3/1999 | Agrawal et al. |
| 5,911,011 A | * | 6/1999 | Henry ........................ 382/232 |
| 5,983,224 A | * | 11/1999 | Singh et al. .................... 707/3 |
| 6,122,628 A | * | 9/2000 | Castelli et al. ................. 707/2 |
| 6,137,493 A | * | 10/2000 | Kamimura et al. ......... 345/423 |
| 6,148,295 A | * | 11/2000 | Megiddo et al. ................ 707/3 |
| 6,226,640 B1 | * | 5/2001 | Ostrovsky et al. ............. 707/5 |
| 6,236,985 B1 | * | 5/2001 | Aggarwal et al. ............ 705/37 |
| 6,263,334 B1 | * | 7/2001 | Fayyad et al. .................. 704/9 |
| 6,289,354 B1 | * | 9/2001 | Aggarwal et al. ....... 707/104.1 |
| 6,307,965 B1 | * | 10/2001 | Aggarwal et al. .......... 382/225 |

OTHER PUBLICATIONS

Kleinberg, Jon "Two algorithms for Nearest–Neighbor Search in High Dimensions", Procceedings of the 29$^{th}$ annual ACM Symposium of Theory of Computing, 1997, Texas, United States. pp. 599–608.*

Callahan et al. "A Decomposition of Multidimensional point sets with applications to k–nearest–neighbors and n–body potential fields", Journal of the ACM, vol. 42, Issue 1, Jan. 1995, pp. 67–90.*

Bakamidis, S.G "An Exact Fast Nearest Neighbor Identification Technique", IEEE International Conference on Acoustics, Speech, and Signal Processing, 1993, pp. 658–661.*

Kushilevitz et al. "Efficient search for approximate nearest neighbor in high dimensional spaces", Proceedings of the 30$^{th}$ annual ACM Symposium on Theory of computing, 1998, pp. 614–623.*

Seidl et al. "Optimal multi–step k–nearest neighbor search", Proceedings of ACM SIGMOD international conference on Management of data, 1998, pp. 154–165.*

(List continued on next page.)

Primary Examiner—John Breene
Assistant Examiner—Khanh Pham
(74) Attorney, Agent, or Firm—Taylor Russell & Russell, P.C.

(57) ABSTRACT

The present invention comprises a computer-implemented method of searching large metric space databases. It allows fast near neighbor searches in databases where the data elements in the database are high dimensional and each data element represents a point in a large metric space. Given a query item, which also represents a point in the large metric space, one or more data items in the database which are approximately nearest neighbors of the query item are found. A set of data items is first preprocessed by computing distances between pairs of items and storing links between pairs which are near one another. A search of the database proceeds by following links from item to item, usually by following links to items which are nearest the query Q. In one embodiment, the search terminates upon reaching an item R which is closer to Q than are all the items to which R links.

97 Claims, 11 Drawing Sheets

OTHER PUBLICATIONS

Yianilos, P, "Data structures and algorithms for nearest neighbor search in general metric spaces", Proceedings of the ACM–SIAM Symposium on Discrete algorithms, 1993, pp. 311–321.*

Indyk et al. "Approximate nearest neighbors: towards removing the curse of dimensionality", Proceedings of the 30th annual ACM symposium on Theory of Computing, 1998, pp. 604–613.*

Bouktache, D, "A fast algorithm for the nearest neighbor classifier", IEEE Transactions on Pattern Analysis and Machine Intelligence, Mar. 1997, pp. 277–282.*

Nene et al., "A simple algorithm for nearest neighbor search in high dimensions", IEEE Transactions on Pattern Analysis and Machine Intelligence; Sep. 1997, pp. 989–1003.*

Arya et al. "Approximate nearest neighbor queries in fixed dimensions", Proceedings of the 4th annual ACM–SIAM Symposium on Discrete algorithms, 1993; pp. 271–280.*

Sunli Arya and David M. Mount, *Algorithms for Fast Vector Quantization*, pp. 1–17, Jan. 1993.

Sunil Arya and David M. Mount, *Approximate Nearest Neighbor Queries in Fixed Dimensions*, pp. 1–10, Jan. 1993.

Sunil Arya and David M. Mount, *Approximate Nearest Neighbor Queries in Fixed Dimensions*, pp. 271–280, Jan. 1993.

Sunil Arya, David M. Mount, Nathan S. Netanyahu, Ruth Silverman and Angela Wu, *An Optimal Algorithm for Approximate Nearest Neighbor Searching*, pp. 573–582, Jan. 1994.

Kenneth L. Clarkson, *A Randomized Algorithm For Closest–Point Queries*, pp. 1–18, Jul. 27, 1987.

Doug Beeferman, "Lexical Discovery with an Enriched Semantic Network", Mar. 12, 1998, pp. 1–10.

Sergey Brin, "Near Neighbor Search in Large Metric Spaces", Feb. 27, 1995, pp. 1–11.

* cited by examiner

SYSTEM AND METHOD OF FINDING NEAR NEIGHBORS IN LARGE METRIC SPACE DATABASES

BACKGROUND

The problem of information retrieval from databases is becoming more and more important as our world moves further into the information age. Not only are databases becoming larger and more ubiquitous, they are being used to store more complex data types than in the past. This might include such data types as textual documents, images, audio clips, and multimedia files. Often such items can be characterized by vectors of relatively large dimensionality. For example, a set of 200 by 200 pixel images could be viewed as vectors in a 40,000-dimensional space. In other situations, complex data types may not be easily mapped into a vector space, yet can still be characterized as points in a "large metric space", in which distances between pairs of data items can nevertheless be computed. In either case, it is desirable to have methods that can quickly search for stored data points which in some sense are good matches for a search query. For example, the query might be an image, and the goal of search might then be to find similar images in the database. Such a search is often called a "near neighbor" search, in that we are seeking stored data items which are nearby the query point, in terms of some distance metric.

There are well-known methods for performing near neighbor searches efficiently when the data dimensionality is small, such as 3-dimensional for example. Typically such methods store the data in some type of tree structure, such that a search can proceed by following a path from the tree's root to a "leaf node" which (hopefully) best matches the query. FIG. 1 illustrates such a structure with a two-dimensional set of data points, lettered a to r. In the figure, the data has been hierarchically clustered into three levels, as indicated by the thickness of the circle representing each point. At the highest level are the data points g, k, and m, which we will suppose were randomly chosen out of the entire data set. These three points are used to partition the rest of the data into three regions, such that any given point is associated with the high-level point it is closest to. The thick lines indicate this separation.

At the next level of the hierarchy, two points have been randomly chosen within each high-level region, and are indicated by medium-thickness circles. For example, e and c were chosen in the "g region". The rest of the data points are then again split up, this time according to which second-level point they are closest to. The thin lines indicate these sub-regions. Similarly, we could form more levels, as would be done in a typical application, which would have many more data points.

FIG. 2 shows how the data set of FIG. 1 can be viewed as a tree, containing a set of "nodes" connected by directed "links". In this case the tree's root node does not correspond to any actual data item, but will be used conceptually as the starting point for any search. More generally, prior art methods sometimes use trees in which no nodes except the leaf nodes correspond to actual retrievable data points. Such differences are not relevant for present purposes, however. Also, some of the tree's nodes contain more than two child nodes; this is done here in order to limit the number of tree levels for explanatory purposes. Prior art methods may in general have any number of children for a given node, but commonly have two or less.

FIGS. 2 and 3 illustrate with dotted lines how a typical search might be conducted within the data set and search tree of FIGS. 1 and 2. In FIG. 3, an additional point, labeled Q is shown, to indicate a hypothetical query point. The goal of search is then to find the data point which is the nearest neighbor of Q. More generally, we might be interested in multiple nearest neighbors, or simply "near" neighbors, that is, approximately nearest neighbors. Starting at the root node, the search first compares Q to each of the first-level nodes. Out of these three, node m is the closest to Q, so it is chosen as the current search node. The child nodes of m are then checked, of which node p is closest to Q, so node p becomes the current node. The children of p are then checked, but neither of them is closer to Q than is p, so the search terminates, with node p as the result.

Note that the result of this particular search, node p, is not actually the nearest neighbor to the query Q. Such a possibility must be considered with virtually any non-exhaustive search method, and can be a problem whenever the query is not identical to any data point. If only an approximately nearest neighbor is required, this may not be a problem. Otherwise, the search must be modified to check additional paths. In the example of FIGS. 1 through 3, it is apparent that a search beginning at node k is necessary in order to find the true nearest neighbor of Q, which is node o. Prior art methods which are tree-based typically use some form of "backtracking" in order to deal with this problem. In particular, they typically use distance information at each node to decide which branches need to be searched, and which don't, depending on how likely each branch is to contain the true nearest neighbor(s). This often takes the form of backtracking, because a reasonable approach is to first do a fast search for an exact match, which only needs to follow one root-leaf path, and then subsequently back up and search other branches if an exact match is not found.

When data dimensionality is large, for example tens of dimensions or more, prior art search methods become less efficient. The same is true for non-vector data items having comparable levels of complexity. The most common approach by far in such situations is still a tree-structured database. A problem with this approach is that the number of tree nodes which must be searched increases severely, until in the limit of very large dimensionality, the search is no faster than simple exhaustive search by direct comparison of the query to every database item. There appear to be at least two reasons for this. The first reason is that for any reasonable data set, the search space becomes mostly empty as the dimensionality grows very large. Put differently, the average distance between a data item and its nearest neighbor grows large and, importantly, becomes nearly the same as the average distance between two randomly chosen points. Another way of saying this is that the distribution of interpoint distances becomes very narrow, with increasing dimensionality. Because of this, measuring the distance between a given point and the query provides very little information as to which other points will be closest to the query. This is a well-known problem, and is often called the "dimensionality curse".

However, while the dimensionality curse seems to be an insurmountable problem, there is an additional problem with tree structures, which has not been addressed by the prior art. In particular, conventional tree structures are too rigid to allow a fast search, even when the dimensionality curse does not apply. A tree only divides up the search space in one way, and any given data item is associated with only one branch of the tree. This rigid division implies that there will be fixed boundaries between sub-regions (as shown in FIG. 1). Moreover, whenever a query point falls near such a boundary, the search procedure will typically need to check the sub-regions on both sides of the boundary. This, of course, makes the search less efficient for such query points. Furthermore, as the effective dimensionality of the space increases, the probability that a query will be near a boundary—and indeed, near many boundaries—increases dramatically. Because of this, a typical tree search in a large-dimensional space is required to check many branches. This problem is a direct result of the use of a strict tree structure, and occurs even when the space is not "mostly empty" as described above. I will call this the "rigid hierarchy problem", to distinguish it from the more general dimensionality curse problem which results from empty space.

There are many variations of tree search methods in the prior art. For example, "vantage point trees" structure the data by placing an item in one branch if it is within a critical distance from its parent item, and another branch if it is beyond that distance. So-called "generalized hyperplane trees" are similar, but place an item in one of two branches, according to which of two reference points it is closer to. More sophisticated methods, such as Brin's GNATs, allow an arbitrary number of such reference points at each branch. (See "Near Neighbor Search in Large Metric Spaces", by Sergey Brin, Stanford University, Department of Computer Science, 1995, pp. 1–11). However, one thing these methods all have in common is that they use a strict tree structure of some sort, in which there is only one path from a given leaf to the tree's root. Because of this, they all suffer from the rigid hierarchy problem just described.

A further disadvantage of these prior art methods is that a near neighbor search is not significantly faster when the query is a known data point than when it is a random point. In other words, even when the query is known to be identical to a stored data point, and the location of that stored point is known, a search for near neighbors (other than the stored point itself) must proceed essentially as if the query were an arbitrary, unknown point—in particular, by starting a new search at the tree's root. A consequence of this is that user feedback cannot be easily used to speed up subsequent searches. For example, a user might flag a particular search result item as being highly relevant to his/her needs, and request other items which are similar to it. Prior art tree methods would not be able to perform such a constrained search significantly faster than an entirely new search. More generally, they cannot easily use previous search results to speed up a subsequent search, even if the new query is similar to the previous query. This can be viewed as another aspect of the rigid hierarchy problem, in that it results from the use of a strict, inflexible partitioning of the database.

So-called "semantic networks" are a type of link-based data representation, which are not limited to a tree shape, but rather can be arbitrary graphs (i.e. "network shaped"). However, semantic networks have not been applied to the general problem of nearest neighbor search. Rather, they are typically used to find "interesting" relations between specified existing nodes of the network, in the form of paths through the network which connect the nodes.

Furthermore, a semantic network search requires specification of one or more stored nodes, as opposed to an arbitrary new item description (as in the general near neighbor search problem). For example, if stored nodes representing "penguin" and "ostrich" were specified, a semantic network search might return a reference to a "bird" node, representing an interesting implicit relation between the specified nodes. However, even a search such as this— which would not normally be used to find near neighbors in any case—depends on the "query" nodes already being stored. Thus a search which specified the prehistoric bird "archaeopteryx" would produce no result, unless a node and corresponding link relations had already been stored for the "archaeopteryx" concept.

Finally, it should be noted that certain structures and methods have been proposed for large-dimensionality searching which are specialized to solve one aspect of the problem at the expense of ignoring other aspects. For example, the OPT-Trees mentioned by Brin (as referenced above) allow for a very small number of distance computations during search, but at the expense of having to traverse multiple lists of N pre-computed distances (N being the number of data points). Because N is often large in applications of interest, such a method, which scales at least linearly in N (as does exhaustive search), is typically not practical for such applications. Similarly, other methods might speed up search at the expense of requiring storage of the order $N^*N$ or worse. Again, such methods, while interesting and possibly useful for small databases, do not scale well to large databases and thus have limited applicability.

It has not been generally recognized in the prior art that the problems of dimensionality and rigid hierarchy are separable. Rather, it seems that when search performance in prior art methods gets worse with increasing dimensionality, researchers attribute this only to the dimensionality curse. Since the dimensionality curse is probably unavoidable, they conclude that greatly improved database searching methods are not possible. Since the rigid hierarchy problem is separate, though, there may nonetheless be methods which significantly improve upon the prior art, even within the bounds imposed by the problems of the dimensionality curse.

SUMMARY

The present invention solves the aforementioned needs. It recognizes that the rigid hierarchy problem is separate from the dimensionality curse problem. It provides a computer-implemented system and method for allowing fast near neighbor searches in databases that represent large metric spaces.

The present invention provides a search method, which finds a near neighbor to a query with fewer distance computations, on average, than comparable prior art tree structured methods. The search method can make use of previous search results to speed up subsequent searches on similar queries. The search time in the present search method scales better than linearly with the number of data items. The storage requirements for the search method are linear in the number of data items.

The present invention allows fast near neighbor searches in large metric space databases where the data elements in the database are high dimensional and each data element represents a point in a large metric space. Given a query item, which also represents a point in the large metric space, the invention finds one or more data items in the database which are near neighbors of the query item. The invention first preprocesses a set of data items, by computing distances between pairs of items and storing links between pairs which are "near" one another. In general, a given item will link to more than one other item, but will link to a small number of items, relative to the total number of items. The set of all links can be viewed as imposing a network structure on the database.

Search of the database proceeds by following links from item to item, in particular preferentially following links to items which are nearest the query Q. In one embodiment, the search terminates upon reaching an item R which is closer to Q than are all the items to which R links.

In one embodiment, the search process is hierarchical, although a hierarchical search process is not required. In a preprocessing stage, a subset of the data items is selected, and links are created between near neighbors within the subset; these links are in addition to the links created within the database as a whole. At search time, a "coarse" search is first done within the selected subset, using only the links within the subset. This may be viewed as searching the highest level of the hierarchy, which contains fewer data items than the entire database, and serves to "narrow" the search. The method then conducts a "fine" search within the entire database, using the entire set of links, starting at the item which was the result of the coarse search. Such a two-level search process can readily be expanded to more levels, to accommodate very large databases. The hierarchical search method is less susceptible to "local minimum" problems than would be a "flat", single-level search.

The present invention comprises a computer implemented method for performing near neighbor database searches. It uses a database, which represents a large metric space having data items, where each data item in the database represents a point in the large metric space. The method selects data items to form a subset. It designates a data item in the subset as a current data item, and computes a distance between the current data item and at least one other data item in the subset. Using the computed distances, at least one near neighbor data item for the current data item is found, and a link is created from the current data item to each near neighbor data item. The steps of designating a data item and using the computed distances are repeated for all data items within the subset. At least one data item from the subset is selected to form a current search set. For all data items in the current search set, a distance is computed between each data item and a query. A distance is computed between the query and a near neighbor data item linked by a data item in the current search set, this linked near neighbor data item is added to the current search set if an addition criterion is met and the computing a distance and adding the linked near neighbor data item steps are repeated until a search criterion is met. The search criterion may be met when a specified amount of processing has occurred, when the item in the current search set closest to the query is within a user-specified distance from the query or when the item in the current search set closest to the query is within a default distance from the query.

In one embodiment, the invention comprises (a) using a database which represents a large metric space having data items, where each data item in the database represents a point in the large metric space, (b) designating all the data items in the database as an initial current subset (c) selecting data items from the current subset to form a new current subset, (d) designating a data item in the current subset as a current data item, computing a distance between the current data item and at least one other data item in the current subset, and using the computed distances, finding at least one near neighbor data item for the current data item, creating a link from the current data item to each near neighbor data item and (e) repeating step d until each data item within the current subset has been designated as the current data item. Steps (c) through (e) are repeated at least once.

The method further comprises (a) setting the current subset level to a selected subset, (b) selecting at least one data item from the current subset level to form a current search set, (c) for all data items in the current search set, computing a distance between each data item and a query, (d) computing a distance between the query and a near neighbor data item linked by a data item in the current search set and (e) adding this linked near neighbor data item to the current search set if an addition criterion is met. Steps (d) and (e) are repeated until a search criterion is met.

In an alternative embodiment, the present invention comprises a computer implemented method for finding a data item nearby a query point comprising (a) using a database with data items, where each data item in the database represents a point in a large metric space, (b) creating links between data items that are near neighbors (c) selecting a data item to be the current search item, (d) computing a distance between the current search item and the query point, (e) computing a near neighbor distance between the query point and a near neighbor item linked by the current search item, (f) if the near neighbor distance is less than the distance between the current search item and the query point, selecting the near neighbor item as the current search item and (g) repeating steps (e) and (f) until a search criterion is met. The search criterion may be met when the smallest distance between any near neighbor items and the query point is greater than the distance between the current search item and the query point. When the search criterion is met, the current search item is selected as a result and the result is an approximately nearest neighbor of the query.

In an alternative embodiment, the present invention comprises a computer implemented method for performing near neighbor database searches comprising (a) using a database which represents a large metric space having data items, where each data item in the database represents a point in the large metric space, (b) computing the distance between data items, (c) storing a link, which is a pointer to another data item, for data items that are near one another; (d) designating an item to be a current search item, (e) computing a distance between the current search item and a query point in the large metric space, (f) computing a distance between the query point and linked items to which the current search item links, (g) if the distance from the query point to the linked item is less than the distance between the query point and the current search item, designating the linked item as the current search item and repeating steps (f) and (g), and (h) if the distance from the query point to the linked item is greater than the distance between the query point and the current search item, designating the current search item as a search result.

The present invention comprises a data structure for storing database items and their links to near neighbor database items comprising a table containing an entry for each of a plurality of data items from a database, each entry comprising the data item and a set of pointers to the near neighbor database items for each subset of data items within the database.

The computer implemented methods are embodied in software programs that may be stored on a computer-readable medium.

BRIEF DESCRIPTION OF THE DRAWINGS

These and other features, aspects and advantages of the present invention will become better understood with regard to the following description, appended claims and accompanying drawings where:

DETAILED DESCRIPTION OF THE DRAWINGS

Prior to the detailed description of the figures, a brief discussion and definition of terms used in the present invention is provided.

The present invention approaches the problem of searching by structuring a set of database items in a particular sort of way. Because this structure is not linear, it does not map straightforwardly onto computer memory. That is, the conceptual relations between items cannot in general be represented by the relations between their physical locations in memory. Rather, relations between items are represented by links (which may also be called pointers). A link represents an asymmetric relation between two data items, such that for any given link, there is a definite "from" item and a definite "to" item. If a link is from an item A to an item B, we may say that "A links to B", or that "B is linked by A". We may also refer to A as the "linking item", and B as the "linked item".

Preferably a link from a given item A to another item B is stored in memory contiguous with other information about item A (such as a description of A, and other links from A). However this is not necessary as long as there is some way to find all links from an item A, given A, and some way to find an item B, given a link to B.

Whether or not the method links two items depends in part on the distance between them. A distance metric is used to determine the distance between items. Almost any distance metric may be chosen. Also, the distance metric used in creating links would ideally be the same as that used for defining the nearest neighbor relation during search. It is desirable that the distance metric be non-negative, and symmetric (distance from A to B equals distance from B to A), as well as satisfy the triangle inequality (sum of distance from A to B and distance from B to C is greater than or equal to distance from A to C). It is also desirable that the distance metric produce a wide range of possible values (at least ten, and preferably many more), given the database to be used. It is also desirable that the distance metric produce a distribution of distances (over all data item pairs) which is as "broad" (high entropy) as possible, given the other goals of the database search.

For example, the distance metric might be the L1 norm (sum of absolute values of vector elements) of the difference between two vectors, if the data items are vectors of equivalent dimensionality. It could also be something more complicated, such as the "edit distance" (according to some known definition) between two character strings, in which case near neighbor search of a dictionary database could be used to suggest alternative spellings of misspelled words.

Figure 1:
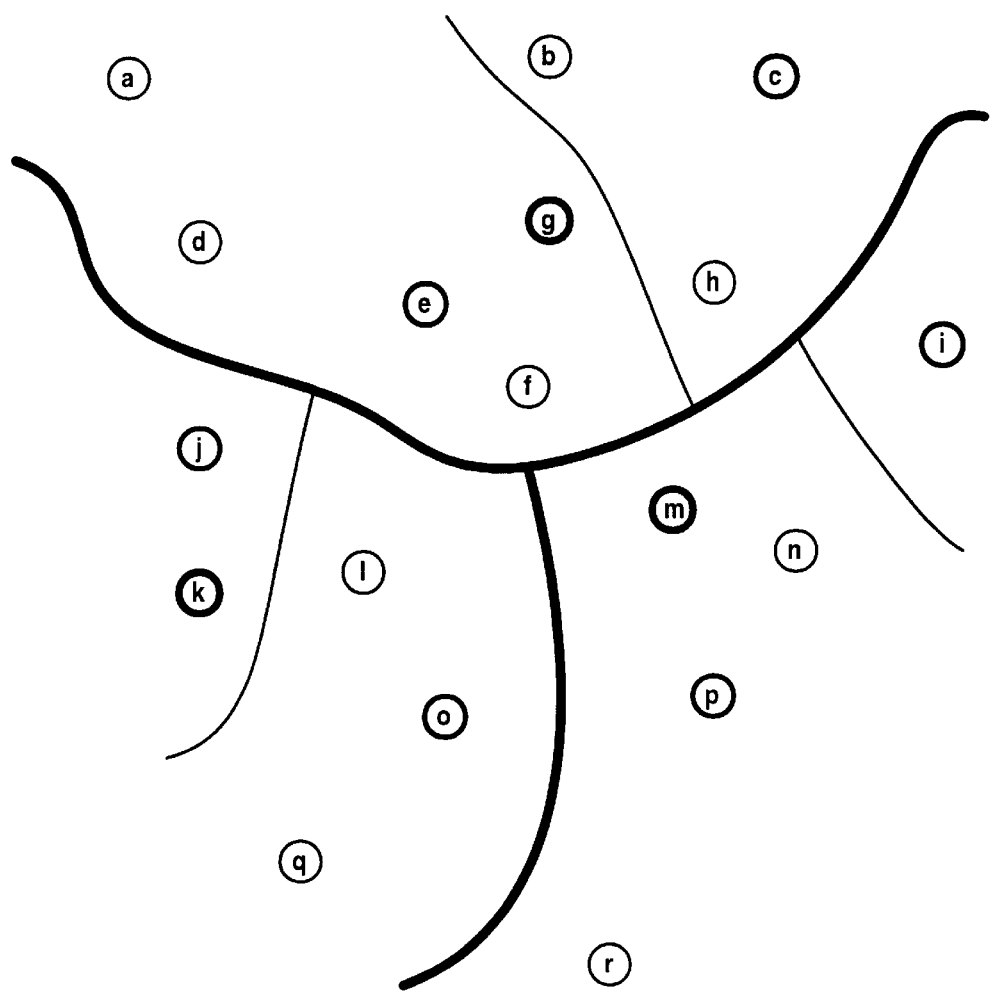
FIG. 1 shows a set of two-dimensional data points, as they might be hierarchically clustered by a prior art tree-search method.
Figure 4:
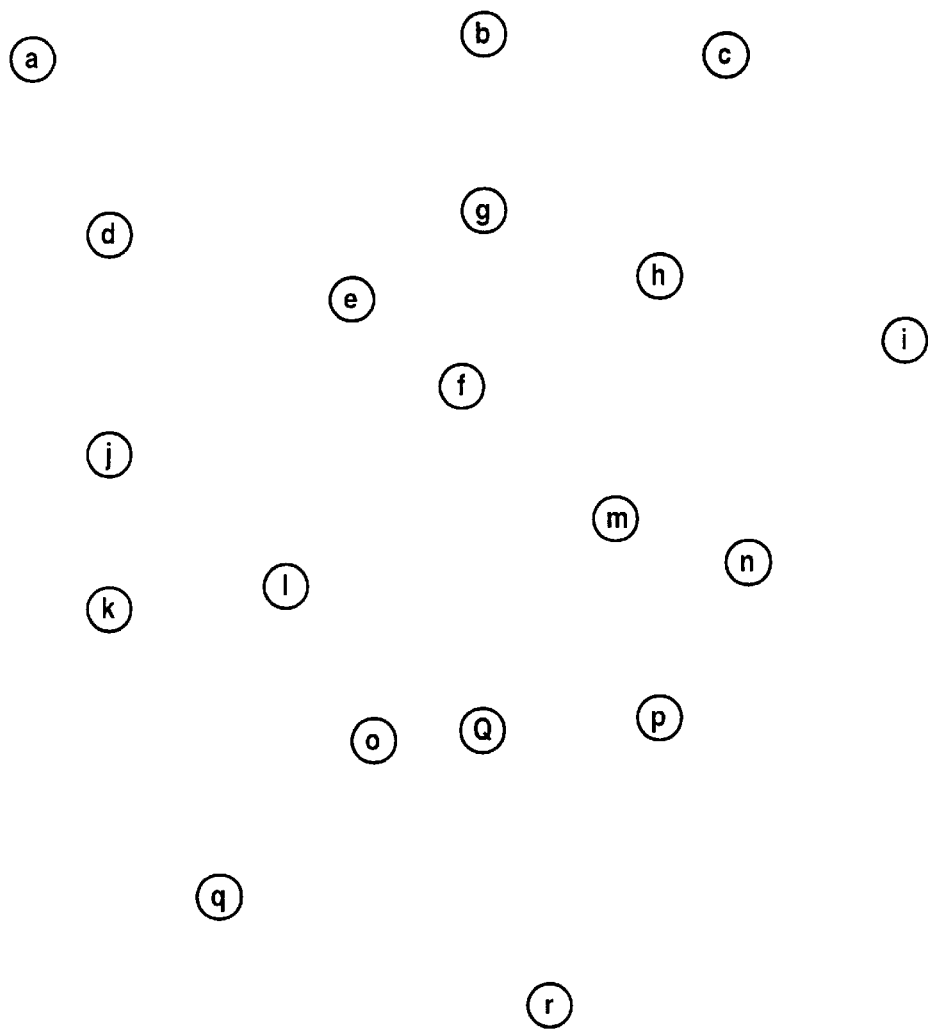
FIG. 4 shows the set of two-dimensional data points of FIG. 1.
Figure 5:
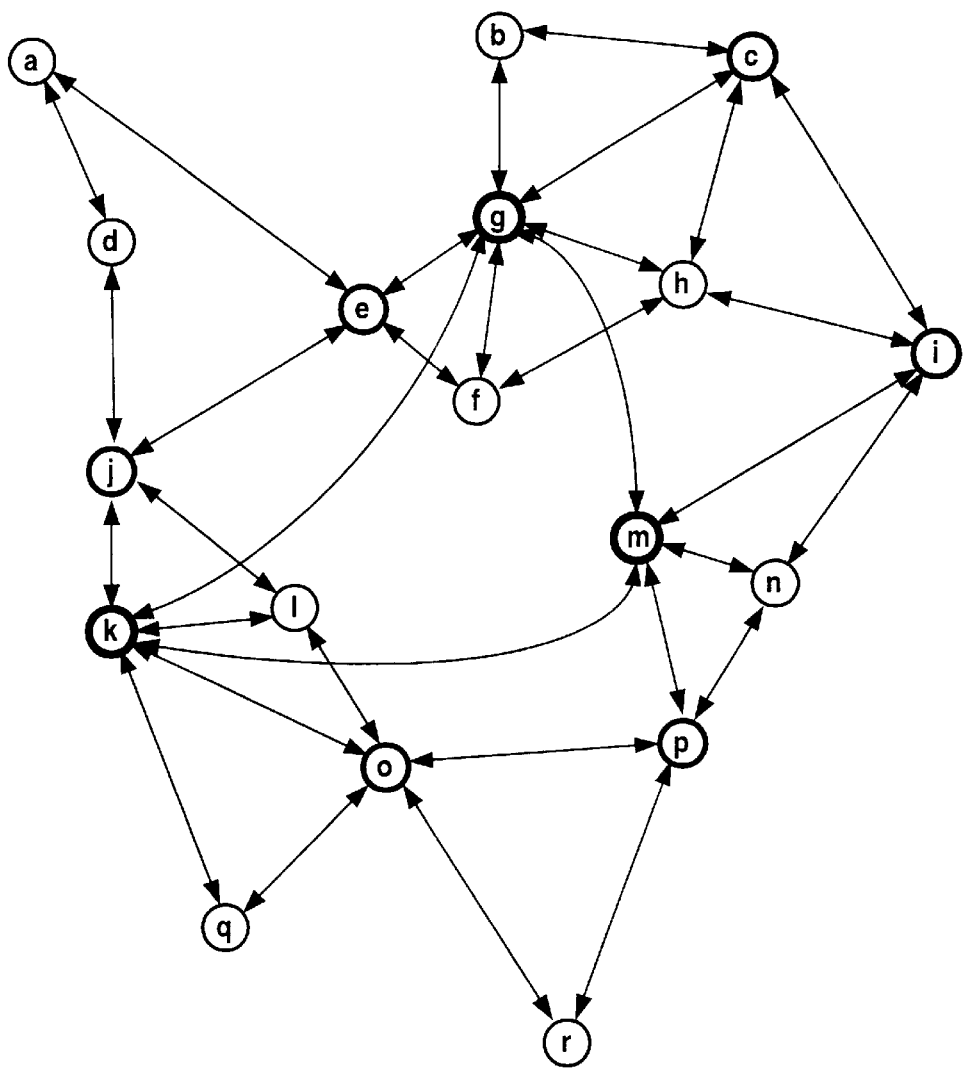
FIG. 5 shows the data set of FIG. 4 structured by an embodiment of the present invention.
Figure 6:
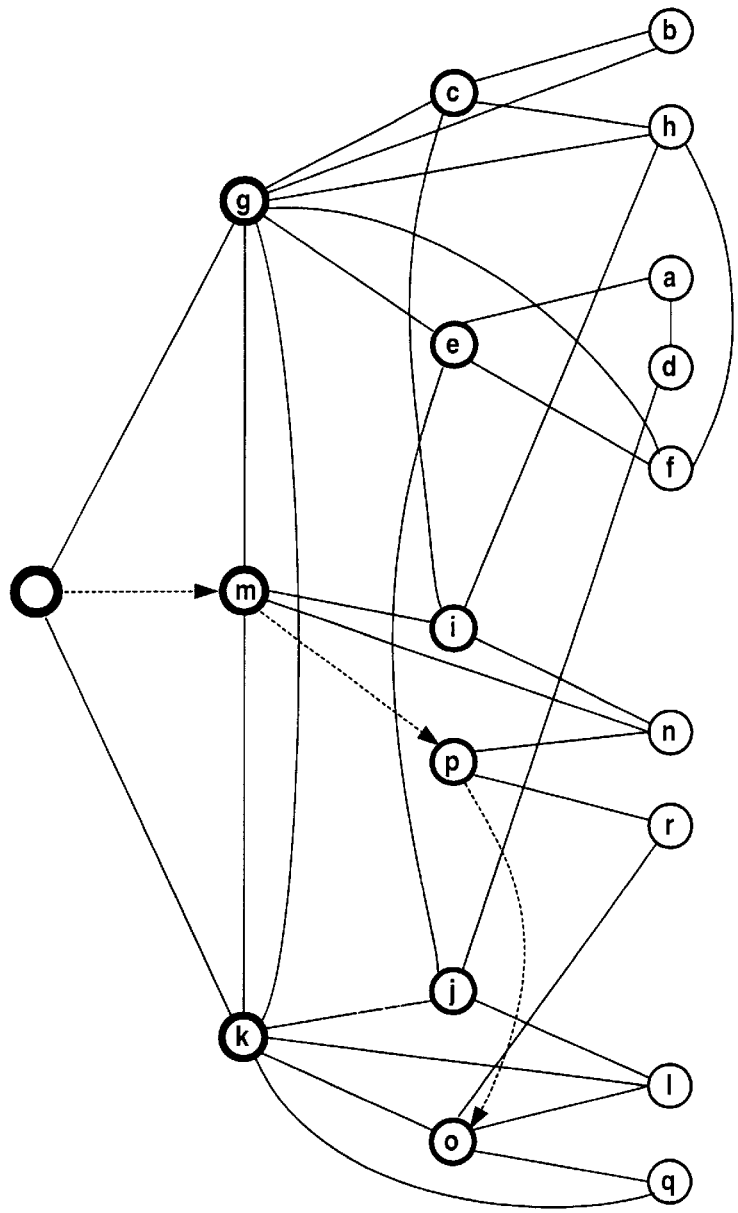
FIG. 6 shows the database structure of FIG. 5 as a hierarchical network.

FIG. 4 shows the set of two-dimensional data points of FIG. 1 without the boundaries used in the prior art search methods. FIGS. 5 and 6 show how the preferred method might be used to structure the simple two-dimensional data set of FIG. 4. In this case, a simple Euclidean distance metric (the L2 norm) is used. But as discussed above, any type of distance metric can be used, subject to the desired characteristics listed above. FIG. 6 shows the same link structure as in FIG. 5, but with the distance relations between items no longer preserved, in order to emphasize the hierarchical nature of the structure (arrows have been suppressed in FIG. 6 for clarity).

In this example, a subset of the data items has been selected, consisting of items c, e, g, i, j, k, m, o, and p. We will refer to this as the Level 1 subset. Out of this subset, another subset, which we will call the Level 2 subset, has been selected, in particular items g, m, and k. These subsets define a hierarchy, and may be distinguished by the thickness of the circles shown in the figures (the subsets chosen are similar to those of FIGS. 1 through 3, for illustration purposes). We will refer to the entire data set as the Level 0 subset, for consistency. Note that as defined, the Level 1 subset is a superset of (i.e. includes) the Level 2 subset; more generally, the Level n subset is a superset of the Level n+1 subset. Care should be taken in interpreting FIGS. 5 and 6, because items which exist in multiple Levels are only shown once, to simplify presentation of the linking structure. Note for example, that item m is actually a member of the Level 0, Level 1, and Level 2 subsets, despite only being shown in one "layer" of the hierarchy in the figure.

Data items are linked according to their neighbor relations. Item A has a link to item B if either A is a nearest neighbor of B, or B is a nearest neighbor of A. This symmetric type of linking is not necessary, but is preferable, as described later. In the example of FIGS. 5 and 6, the two nearest neighbors of an item are used, although in a typical application this number will be greater, as elaborated below.

Link structures are determined independently for each Level n subset, with a different set of links existing for each Level (although some links may be duplicated in multiple Levels). Thus for example, since there are only three items in the Level 2 subset in this example, each of the items g, m, and k is linked to each of the others (its two nearest neighbors) in Level 2. But since each of these items also belongs to Levels 0 and 1, it will also have links to items which occur only in those lower Levels (again, with the caveat that a nearest neighbor within a Level might also happen to be a nearest neighbor in another Level).

Some observations can be made about FIGS. 5 and 6. Notice first item a, which occurs only in Level 0. It is given a link to each of its two nearest neighbors in Level 0 (i.e., out of all the items), namely items d and e, and each of those nearest neighbors is in turn given a link back to item a. In contrast, item h, which is also only in Level 0, has a total of four links. This is because, while we have defined the number of nearest neighbors to be two, there is no limit on how many items can have h as their nearest neighbor. Items can also gain more links by virtue of being in a higher Level, whereby they are allowed to link across greater distances. Item g, for example, has relatively many links partly because it is given links to the relatively distant Level 2 items k and m, in addition to the links it has with items in Levels 0 and 1.

Figure 2:
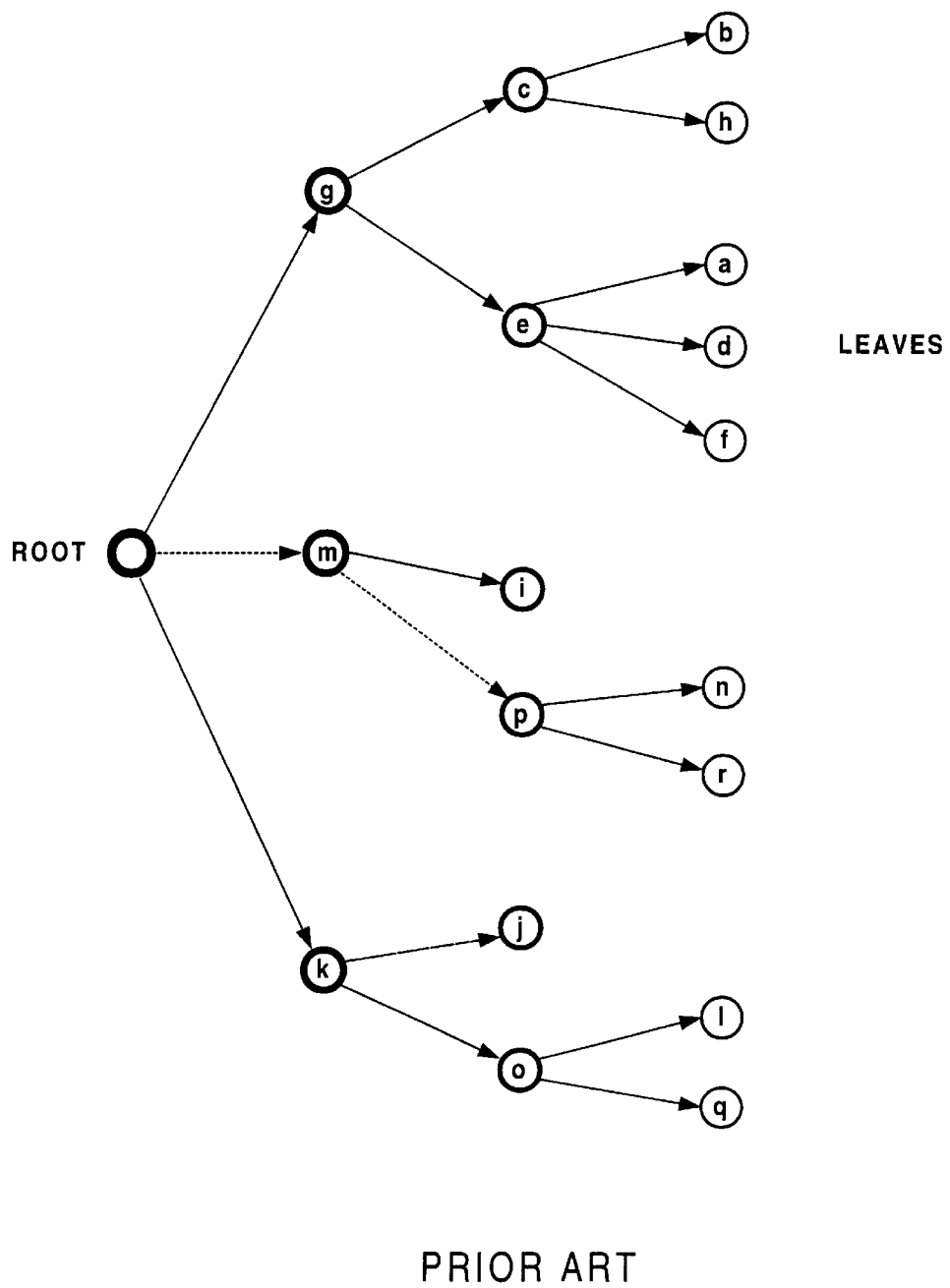
FIG. 2 shows the structured data set of FIG. 1, viewed as a search tree.
Figure 3:
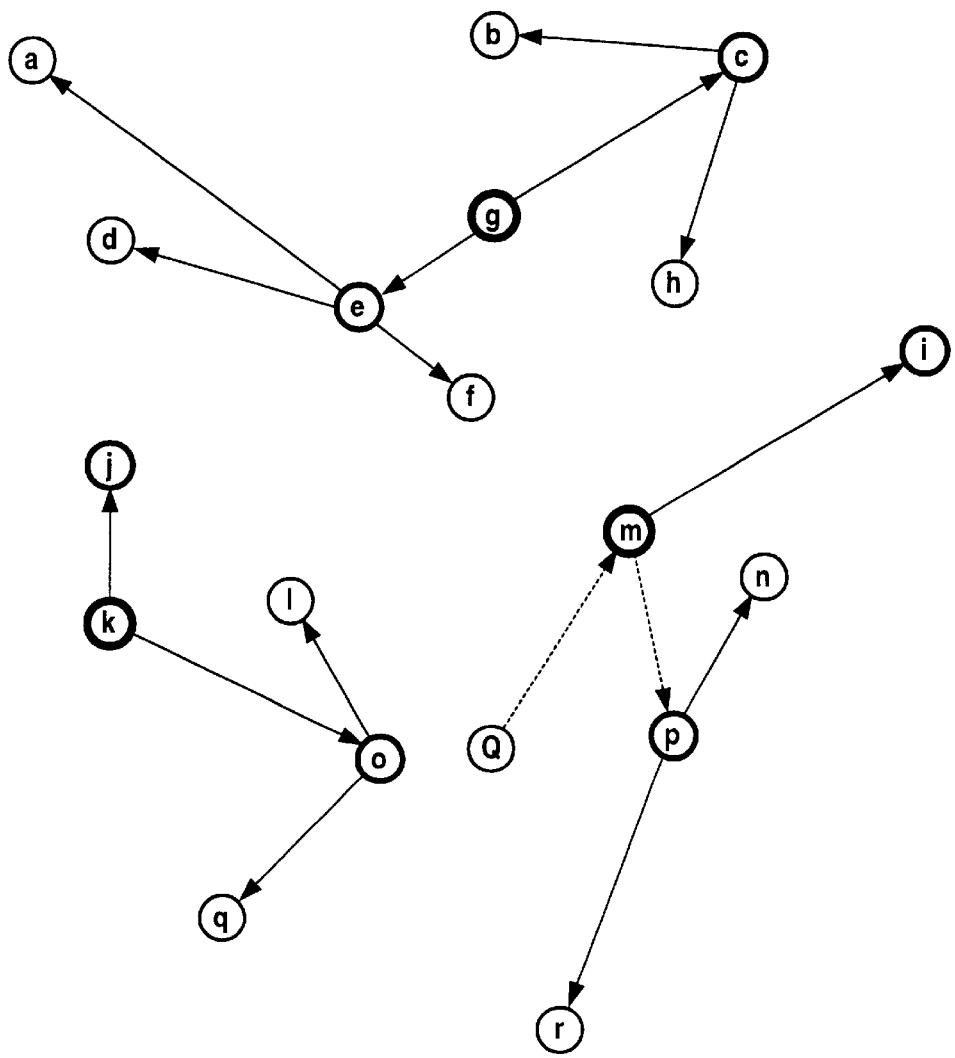
FIG. 3 shows a search path within the data set of FIG. 1, resulting from processing a query point Q using the search tree of FIG. 2.

In comparing FIGS. 5 and 6 with FIGS. 1 through 3, it is immediately obvious that the present method creates many more links than does the prior art method. Importantly, though, the advantages of the present method do not derive simply from an increased number of links. It is also important that the links represent neighbor relations, as determined by a known distance metric, and that they reflect a general network structure rather than a strict tree. Furthermore, while the hierarchical structure as shown in FIG. 6 resembles a tree in some ways, its use during search is considerably different than the typical prior art use of a search tree. This is further described below. The structure used by the preferred method might well be called a "hierarchical network structure", in that it makes use of a separate network structure at each of a hierarchy of Levels.

Figure 7:
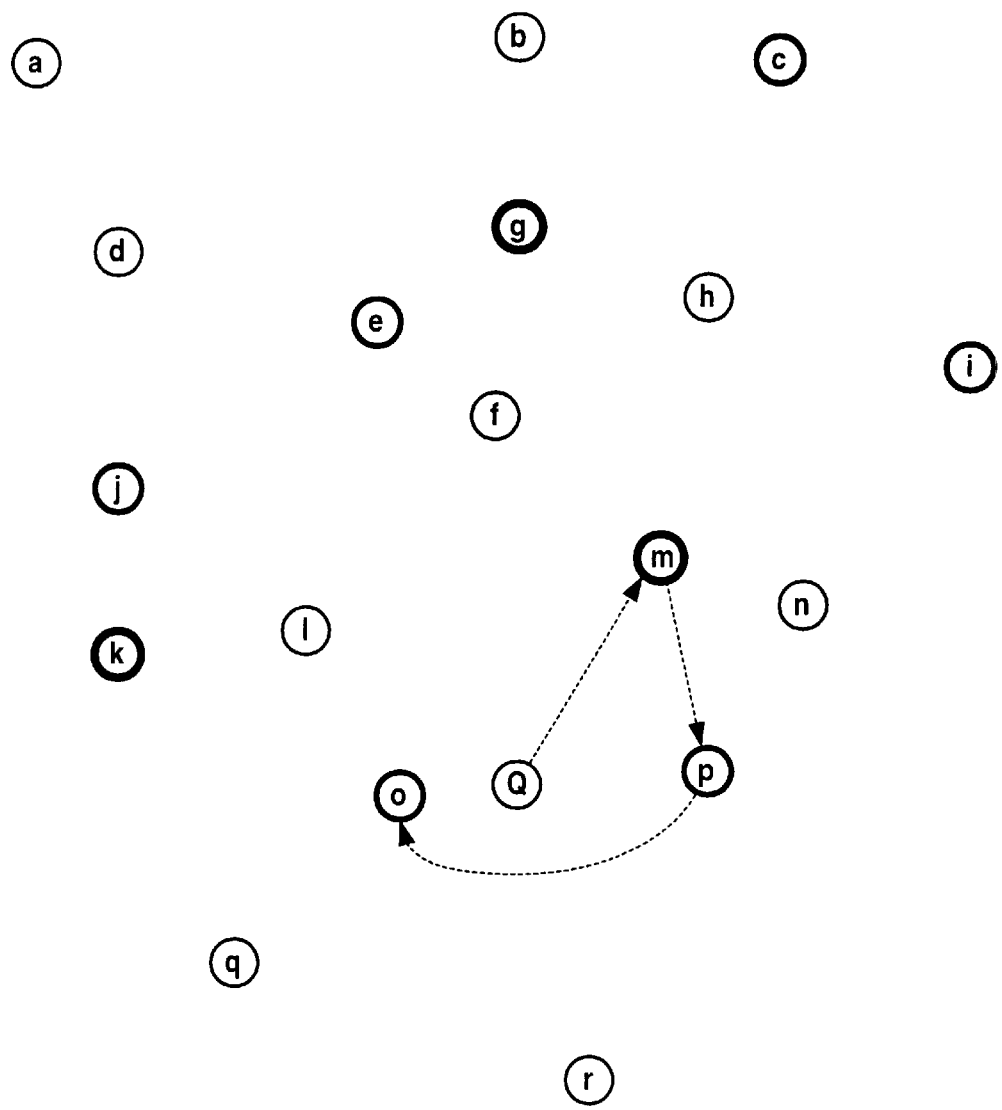
FIG. 7 shows a search path resulting from processing a query point Q using the database structure of FIGS. 6 and 7.

It is also instructive to look at the particular example query Q of FIGS. 2 and 3, as it would be handled by the present method. The dotted lines in FIGS. 6 and 7 indicate the method's search path. A "current search set" is initialized to contain a random one item of the highest-Level subset (Level 2, containing items g, m, and k). For the purposes of this example, assume that item m is chosen. The query is compared to m and every item that m links to, with the result that item m is closest to the query. Because of this, no other items in the highest Level are added to the current search set, and the search within the current Level is complete.

The search process then moves to Level 1, and examines all Level 1 subset items to which any item in the current search set links. Because item m is the only item in the current search set, this means only links from item m (within Level 1) are now relevant. Of these linked items, p is the closest to Q, so p is added to the current search set. Furthermore, in one embodiment, only one item is maintained in the current search set at any one time, so item m is removed from the current search set (because p is closer to Q than is m). All of the Level 1 subset items to which p links are next compared to Q, and item o is found to be closest to Q. Item o is placed in the current search set, and item p is removed. The same procedure is performed on item o's linked items, but none of these is closer to Q than is o, so the Level 1 search is done. The method proceeds to the Level 0 subset, and compares Q to all Level 0 items to which o links. However, none of these is closer to Q than is o, so the search terminates with item o as the result.

In this particular example, the present method found the true nearest neighbor to the query without any backtracking, whereas the prior art example did not. The present method will not always find the true nearest neighbor, but may instead find an approximately nearest neighbor. The likelihood of finding the true nearest neighbor can be increased in various ways, some of which are described below.

Figure 8:
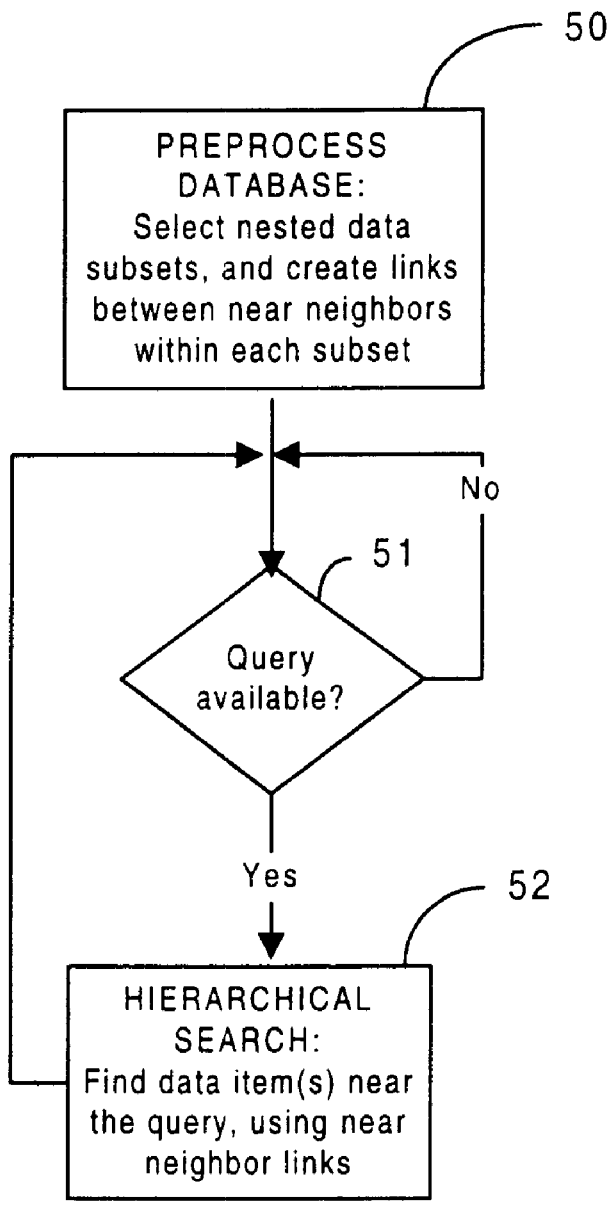
FIG. 8 is a flowchart providing an overview of the processing of the preferred method.

FIG. 8 shows an overview of the operation of the preferred method over its lifetime. The method begins with preprocessing of the database 50, wherein data subsets for the various Levels are created, and near neighbors within each subset are linked together. The preprocessing of the database 50 is illustrated in more detail in FIG. 9, and is further described below. The preprocessing of the database 50 corresponds to what is often called in the prior art "database population", "database structuring", or "index creation".

After the preprocessing of the database is complete, a check is made to determine if a query is available to be processed 51. If a query is available 51, a hierarchical search is performed 52. In the hierarchical search 52, one or more data items near the query point are located, using the near neighbor links of the database structure. This hierarchical search block is illustrated in more detail in FIG. 10, and is further described below. After the available query has been processed 51 and the hierarchical search results returned 52, or if no query was available to be processed, the processing of step 51 is repeated.

Figure 9:
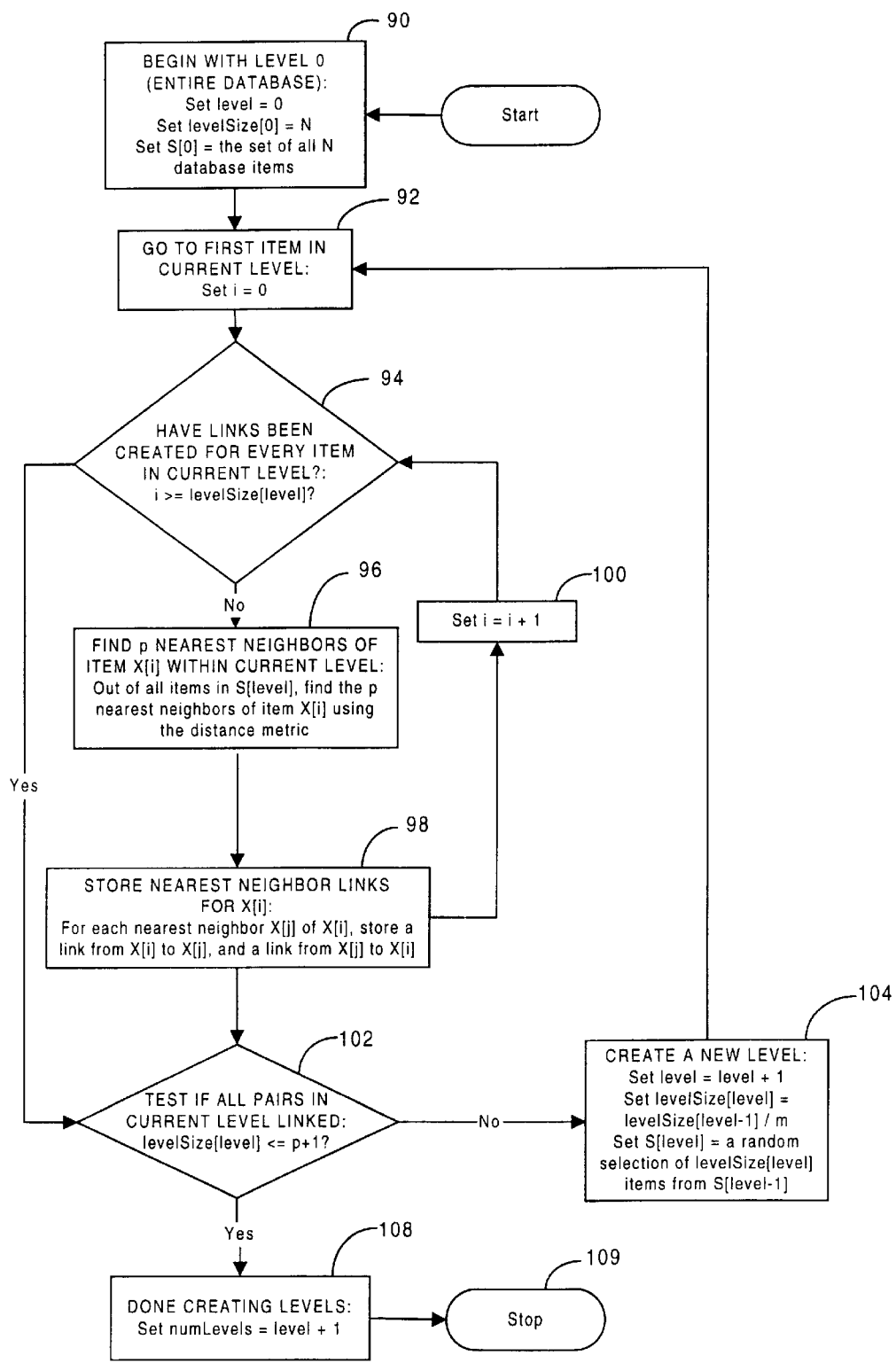
FIG. 9 is a flowchart showing the preprocessing procedure of the preferred method in more detail.

FIG. 9 shows a detailed flow chart of the preprocessing of the database. Preprocessing of the database begins with the entire database 90. The variable level is initialized to zero (which represents the entire database set of items). The variable level keeps track of which Level of the hierarchical network structure is currently being created, with Level 0 comprising the entire set of N data items. The number of items in each Level is stored in an array variable levelSize, and thus levelSize[0] is set to N. The array variable S is used to designate the actual subsets of data items at each Level, so S[0] is assigned the set of all N data items contained in Level 0. Note that S[n] corresponds to the "Level n subset" as mentioned previously.

The next step is the creation of the various Levels of the hierarchical network database structure. There are two main phases to the creation of each such Level: (1) selecting a subset of data items to represent the Level; and (2) creating near neighbor links between items in the Level. The first time through the preprocessing steps, the data subset has already been created for Level 0, so near neighbor links within Level 0 are created.

The first step in the creation of near neighbor links is to go to a first item in the set. Creation of near neighbor links involves first setting a variable i to zero in block 92. This variable i is simply an index which uniquely identifies an item within S[level], and ranges from 0 to levelSize[level]−1. In the following, "X[i]" is used to designate that item which i uniquely identifies. In a typical application, a table that maps, one-to-one, these indices into another system of item identifiers, such as memory pointers, would be created. If links have been created for every item in the Level 94 processing continues in 102.

If links have not been created for every item in the Level 94, the nearest neighbors of the current item are found within the current Level 96. Given a particular item X[i] within S[level], the p nearest neighbors of X[i] within S[level] are found 96 (not including X[i] itself, that is). If, as is possible at a high Level, there are fewer than p+1 items in the Level, then the number of items (not including X[i]), levelSize[level]−1, is used instead of p. This substitution should be assumed throughout the following.

The nearest neighbor relation is defined using a distance metric. The same distance metric may be used to search for a near neighbor when processing a query. Preferably, the p nearest neighbors are determined by exhaustive evaluation; that is, by computing the distance dist(X[i], X[n]) between item X[i] and item X[n], for all n (n not equal to i) within S[level], and selecting the p items which produce the smallest such distances. If necessary, ties are broken by random selection. Note that this exhaustive evaluation implies that preprocessing time will scale with the square of N. For many applications this will be acceptable, because preprocessing only needs to be done once, and it is mainly the subsequent query processing which is time-critical.

The value p, the number of nearest neighbors to use for link creation, may be a default value selected by the user or program or it may be selected by experimentation. While p is preferably set to the same value throughout preprocessing for convenience, it may vary from Level to Level in the hierarchy, and even from item to item within a Level as well.

Experimentation may allow the value of p and other method parameters to be optimized. For example, a coarsely spaced set of reasonable values may be selected for each parameter, and an experiment may be performed for each parameter combination in the resulting "grid" of combinations. Such a "grid search" can then be followed up, in the region of parameter space near the best combination so far determined, by a similar grid of finer parameter ranges (and so on, with successively finer searches). Such a grid search is the ideal way to set parameters, because each particular application of the method will have its own requirements with respect to speed, storage, and the like, and will have different available hardware and different data types, for example.

If experimentation is not used, a preferred default value for p is 20. Such a value produces reasonably good performance, virtually irrespective of database size. If experimentation is possible, a minimum value would be 2. It is harder to set a maximum, because search will in general be more accurate, but slower, with greater p, and thus the requirements of the particular application will be very important. For most database searching, the value of p should not need to be greater than 1000. Typically much smaller values for p (e.g. 10 to 50) should suffice, because the hierarchical nature of the search is designed to compensate for the use of relatively small numbers of links per item. The value of p need not be the same for every data point. For example, data points which are more "important" in some sense might well be given more links, to make them more likely to be found by the search process.

Once the p nearest neighbors of the current item X[i] are found in block 96, the near neighbor links for the current item are stored 98. They may be stored in an array variable containing all links for the database, if a pointer to an item's links is stored with the item. The links from an item may be (as preferred) stored near the linking item's description and/or near other information related to the linking item. In any case, it is desirable that the links from an item can be located relatively easily, given a reference to the item.

By storing all of an item's outgoing links together, the identity of the "from" item for a link is implicit in the storage location; this allows a link to be represented by just the identifier of the "to" item, thus reducing overall storage. In one embodiment there is a link from item X[i] to item X[j], corresponding to every link from X[i] to X[j]. This helps insure that an otherwise "isolated" item, which is not one of the p nearest neighbors of any other item, can nevertheless still be found during search. Thus, links are stored from X[i] to its nearest neighbor items, and corresponding inverse links are stored from each of these nearest neighbors back to X[i] 98.

Once the links for X[i] have been stored as in block 98, links are created for the next item 100 (i=i+1) and the process 94 is repeated until links are created for all items within the current Level, S[level]. The decision 94 keeps track of when to end this link creation loop, that is when links have been created for every item in S[level].

A decision 102 is next made regarding whether an adequate number of Levels, or subsets, has been created. In particular, if the number of items in the current Level is less than or equal to p+1, no more Levels will be created. In such a case, a variable numLevels is set equal to level+1, and the preprocessing block is exited. The purpose behind this decision 102 is to insure that in the highest Level, all items are linked to all other items. This means that the search within the highest Level will be exhaustive, regardless of which item is chosen as the starting point for the search. While such a method is preferred, an alternative embodiment might use a different criterion, such as to impose a user-defined maximum on the number of items to be contained in the highest-Level subset.

If there are not yet enough Levels (subsets), as per decision 102, a new Level is created 104. The variable level 104 is incremented, and the number of items in S[level] (the next highest Level) is determined. This number, levelSize [level], is computed by dividing the number in the previous Level, levelSize[level−1], by a fixed constant m, using integer division (i.e. ignoring any remainder). Considerations for setting the parameter m are similar to those mentioned with respect to setting p. In particular, experimentation, along with various settings of the other parameters, is the preferred method. However, if resources do not permit experimentation, the preferred default value for m is 10. An alternative embodiment might set m such that, given N, a pre-specified number of hierarchy Levels would be created. In general, m should be similar in value, or less than, p. increasing m tends to reduce the number of Levels, which tends to increase search speed and reduce storage somewhat. However, increasing m will also tend to make search less accurate, i.e., less likely to find the true nearest neighbor.

As part of the creation of a new Level 104, the items to go in the new Level (or subset) S[level] are chosen. These are preferably chosen randomly from those in the previous Level (S[level−1]). However, applications may benefit from a non-random selection. For example, each data item may have a relative "importance" value, which is correlated with an a priori likelihood that the item will be a good search result. In such a case it could be useful to have more important items at higher Levels of the hierarchy, because this would speed up search access to them. However, it is also important, for the overall method to be most effective, that the items in a given Level are representative of the distribution of items in the lower Levels; this is why random selection is preferred. The goal of any variant data item selection method is to compromise between speeding up the search process and having the items in a given Level be representative of the distribution of items in the lower Levels.

If an item occurs in multiple Levels or subsets, it will have a separate set of links within each Level in which it occurs. However, the item's description, perhaps including meta-data, is the same regardless of Level. Thus the actual item data is not stored in S[level], but rather a pointer to the item's data. Item data may include, for example, the item description itself, which is used to compute inter-item distances, the item's links, and any meta-data or other supporting data about the item.

After the new Level is created and the data items are selected for the new Level 104, processing repeats at step 92 to begin the link creation for the items in the new Level.

The search process will now be described from a general point of view, to provide a context for the description of one embodiment of the search process, given below.

Throughout the search process, the method maintains a "current search set", which is a set of candidate result items. The goal of search is to iteratively improve the "goodness" of the current search set, that is the overall degree to which items in the current search set are close matches to the query. The search typically terminates when the current search set is "good enough" (according to a pre-specified criterion), or a when a pre-specified processing amount has occurred.

A search proceeds generally as follows. The current search set is first initialized with one or more items. Near neighbor links are followed from the item(s) in the current search set, and the linked items (the "to" items of the links) are compared to the query. Linked items which are relatively good matches to the query may be added to the current search set. Also, items may be removed from the current search set, in particular those items which are now relatively poor matches to the query, given the newly added items. Given the updated current search set, the loop repeats by following links from newly added items, comparing the new linked items to the query, and so on.

When a new item is found by following a link from an item in the current search set, a decision is made whether to add the newfound item to the current search set. This decision may be deterministic or probabilistic. For example, the newfound item might be added to the current search set if and only if it matches the query better than does the best-matching item already in the current search set. Or, it might be added if it matches the query better than does the worst-matching item in the current search set. Or, the newfound item might be added conditional on the value of a random variable, such that the probability of adding the item is inversely related to the distance between the item and the query (that is, better matching items are more likely to be added). A deterministic decision has advantages of speed and simplicity of computation. However, probabilistic additions can allow for more accurate search overall, because they will tend to avoid local minima (assuming there is high probability that at least one new item will be added at each iteration, so that the search does not terminate prematurely).

A decision is also made on each search iteration whether to remove any item(s) from the current search set. One approach would be to keep the k items which best match the query, and remove all others. Indeed, one embodiment to be described uses such an approach, with k set to 1. Using larger values of k generally makes the search more accurate, at the cost of slower search performance.

Note that it is possible, given the link structure, that an item in the current search set will have a link to another item which was or is already in the current search set. This could result in computing the same query-to-item distance multiple times. This may be easily avoided by maintaining, during each search, a list of all items which have been compared to the query, along with the corresponding distances. Well-known hash table techniques can allow fast access to items in such a list. If a linked item is already in this list, its distance to the query may simply be read from the list rather than re-computed.

If there is more than one Level in the link hierarchy, as is preferable, then whenever links are followed from an item in the current search set, there is a choice of which links to use for that item (assuming the item has links in multiple Levels). The simplest, and preferred, method is to use only links in the highest Level until a search criterion is met in that Level, and then use links in the next lower Level until a search criterion is met, and so on. However, other embodiments might use lower-Level links for some items while simultaneously using higher-Level links for other items. Still other embodiments might skip one or more Levels of links.

An especially interesting (but relatively difficult to implement) embodiment is one which switches to next-lower-Level links on an item-by-item basis, based on the item's degree of match to the query. For example, if an item in a relatively high Level were determined to be "very close" to the query, the search could potentially be sped up by jumping straight to the lowest-Level links for that item. In effect, there would be no need to do any further "coarse" searching, and it would make sense to switch immediately to a "fine" search. The need to determine the criterion for "very close" is one reason such an embodiment is not preferred.

The search procedure of one embodiment is now described. As mentioned, it makes use of multiple Levels of links, and a hierarchical search. It maintains just one item at a time in the current search set; this allows a relatively simple implementation which avoids significant looping through lists of current search set members. The decision whether to add a newfound, linked item is simple: a linked item is added to the current search set if and only if it has smaller distance to the query than does the item already in the current search set. In such a case, the previously existing item is then removed from the current search set; thus, the removal decision is also simple. Search begins at the highest Level of the hierarchy (i.e. the Level with the fewest items), and proceeds to the next lower Level each time an item is found which matches the query better than does its best-matching linked neighbor. If there is no lower Level, the search terminates.

Figure 10:
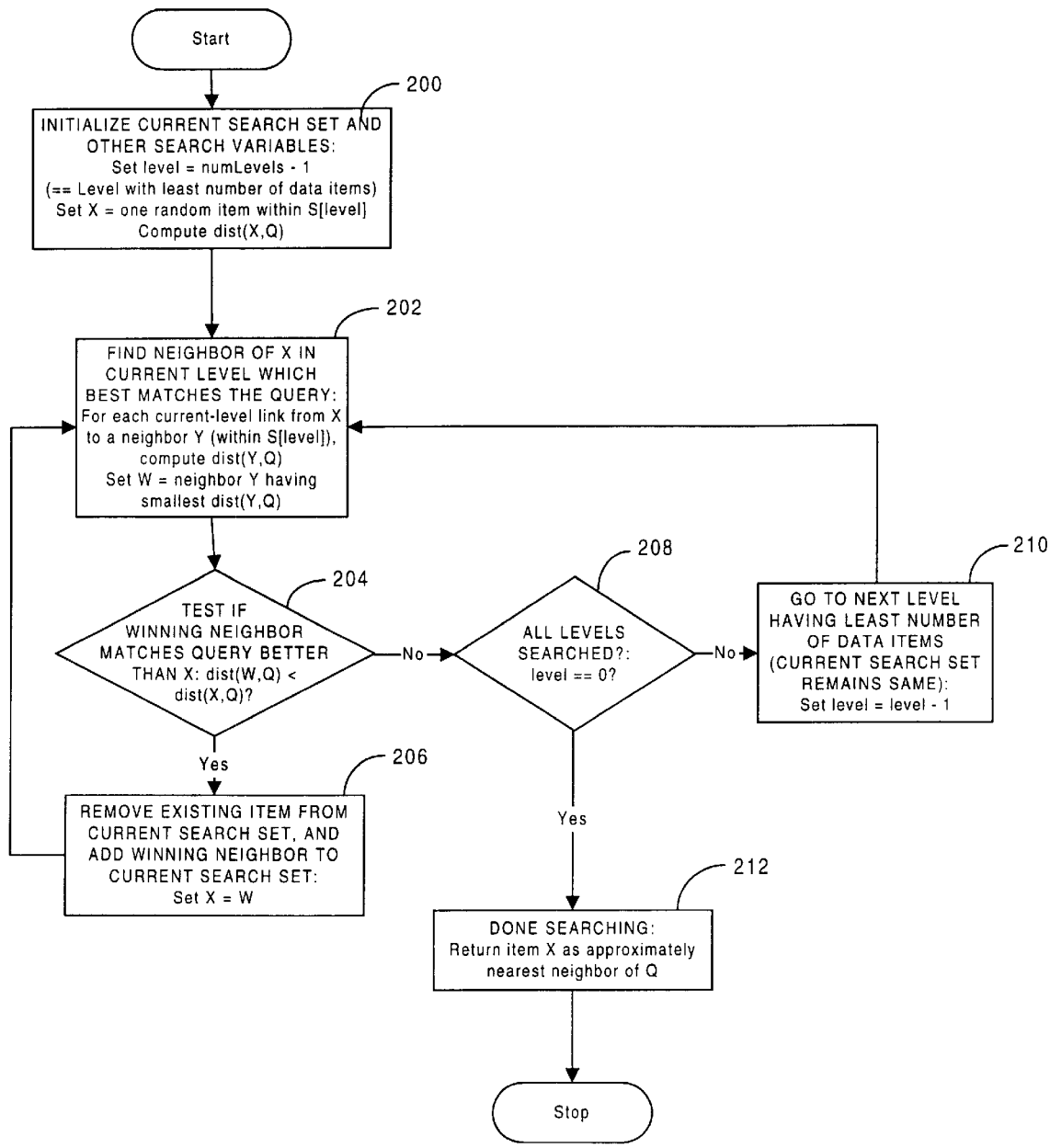
FIG. 10 is a flowchart showing the hierarchical search procedure of the preferred method in more detail.

FIG. 10 shows a detailed flow chart of performing the hierarchical search of one embodiment of the present invention. Variables of the search process are first initialized 200. This initialization 200 comprises first setting a variable level to numLevels−1. This variable level keeps track of the Level of the hierarchical network structure in which the search is currently focused, beginning with the highest Level (the subset with the least number of data items). Initialization continues by selecting an item at random from the highest Level subset, S[level], and assigning it to an item variable X Because this embodiment maintains only one item in the current search set at a given time, this variable X represents the current search set. X could also be considered the "current item" or "focus" of the search.

Next the distance is computed between X and the query, designated as Q. The distance is computed using a distance metric. The particular distance metric used is application-dependent, but is ideally the same distance metric used in creating nearest-neighbor links within the preprocessing block as discussed in FIG. 9. The same distance metric is normally used for the other distance computations throughout the search block.

Next, the linked neighbor of X in the current level (S[level]) which "best" matches the query is found 202. The distance is computed between each linked neighbor of X and the query. Each of these linked neighbors, as described previously, will be an item within the current Level or subset (S[level]), and will be pointed to by a link from X within the current Level of links. An item variable W is set equal to the neighbor of X which has the smallest distance to Q. Ties are broken by random selection.

Next, it is determined whether X or W is closer to the query Q 204. If the item W is closer to Q, then the item referenced by W becomes the item in the current search set (X is set to W) 206. Processing is repeated 202 and the search continues within the current Level.

If X is closer to Q than is W 204, the search within the current Level is completed, with X being the best-matching item found within the Level.

If the current Level is not the lowest Level, the next lowest Level is to be searched 210, which is the subset with the next least number of data items. The variable level is decremented to begin a finer search within the next Level.

The result of the previous Level search, X is used as a starting point for searching this Level. X still refers to the same item as in the previous, higher Level, although now the search will use links and neighbors within the new, lower Level. Processing is then repeated at step 202.

If this is the lowest Level 208, searching is complete since all Levels have been searched. The currently best matching item, referenced by X is returned to the system user as the search result 212. Other embodiments, which may allow more than one item in the current search set, may return one or more of the best-matching items from the final current search set.

Note that if a larger number of result items is desired, a list of other relatively good-matching items may be obtained by simply following the Level 0 links from items within the final current search set (item X, in this case). Such a list may be expanded ad infinitum by following the links from those linked items, and so on. It may be desirable to sort such a list in order of increasing distance from Q, before presenting it to the user. As with the top result X, this set of results is not guaranteed to be the true nearest neighbors, but rather a set of near, or "approximately nearest", neighbors.

This procedure of expanding the result set can also be used to quickly find near neighbor items when the query corresponds to a stored item, and the identity of that stored item is already known. Such a situation may arise, for example, when the user has previously been presented a list of result items, and has indicated that one of those result items is particularly relevant to his/her information needs. That specified item can simply be treated as if it were the best-matching result of a search, and thereby a suitably long list of its neighbors can be obtained as just described. This is a very common problem in information retrieval in general, which in the prior art has typically been handled by initiating a new search. The present method typically requires much less processing in such situations, because near neighbors for stored items are precomputed, and thus no searching is required.

Figure 11:
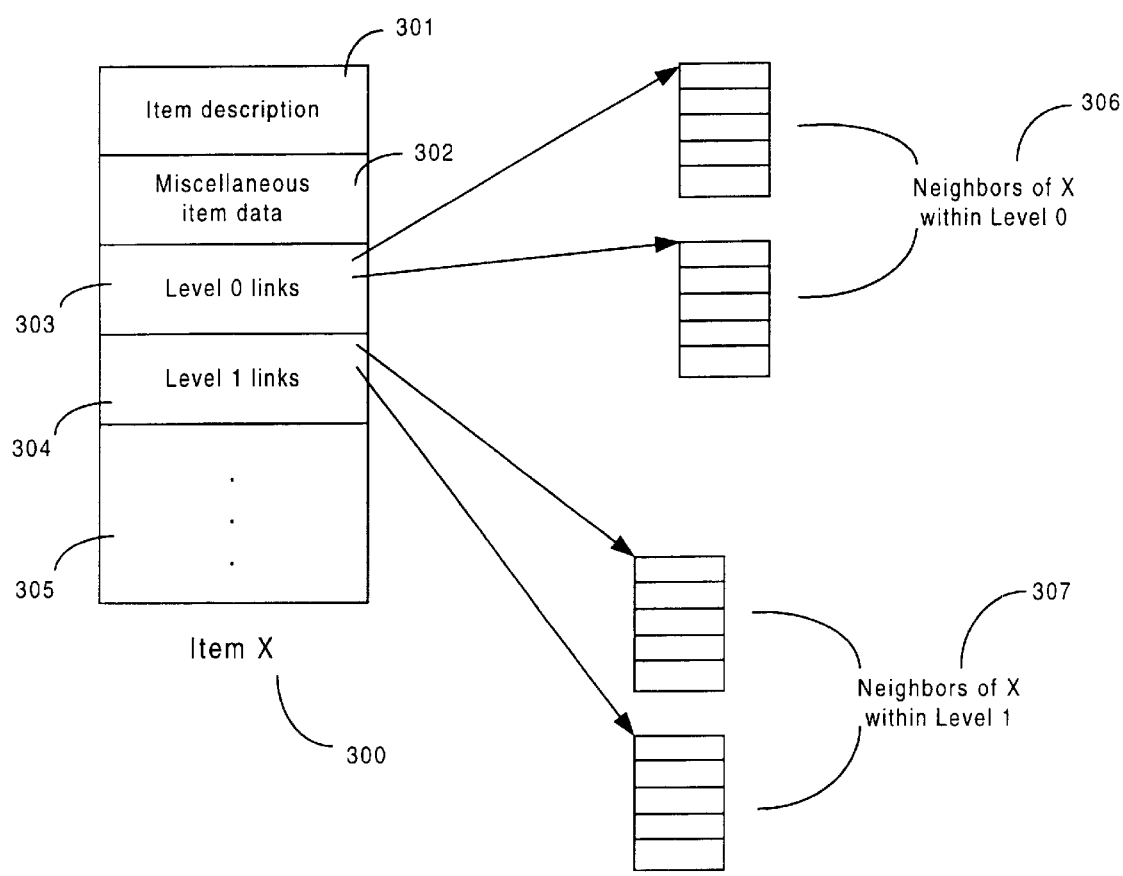
FIG. 11 shows a storage format for a database item within computer memory.

FIG. 11 shows a storage format for a database item within computer memory. The database item 300 is stored at a memory location. Reference to the memory location uniquely identifies the database item. The address of this beginning memory location is used as the identifier of the item, for example within links to the item. The item's description 301 is stored first. It describes the location of the item within the metric space the database represents; for vector items, e.g., the description would be the vector itself. Following this are any other miscellaneous data 302 about the item that might be needed by the software application, such as a human-readable textual description of the item.

The links from an item 303–305 may be stored following, and contiguous with, the miscellaneous data 302 for the item. For example, the Level 0 links 303 contain links (or pointers to a memory location) for the neighbors of X within Level 0 (306). Likewise, assuming X exists in Level 1, the Level 1 links 304 contains links for the neighbors of X within Level 1 (307). During search, the links emanating from the item are often required at the same time as other data for the item. Storing them together in memory can thus improve performance in situations where memory contents must be swapped out to disk, because fewer disk accesses will be necessary on average.

A database item X (300) may exist in any number of Levels of the hierarchical network structure. The miscellaneous data for item X may include a count of the number of such Levels in which X exists. For each such Level, X has some number of links to other items within that Level 303–305. Each such set of links is stored together, as shown in FIG. 11. Preceding each set of links in memory is a count of the number of links X has in the Level, which allows the search procedure to determine which links correspond to which Level (links are stored in order of increasing Level number, as in FIG. 11). A link itself consists of simply the memory address of the item linked to. The links from the neighbors of Item X back to Item X may exist, but are not shown in FIG. 11, for clarity.

Using the foregoing, the invention may be implemented using standard programming or engineering techniques including computer programming software, firmware, hardware or any combination or subset thereof. Any such resulting program, having a computer readable program code means, may be embodied or provided within one or more computer readable or usable media, thereby making a computer program product, i.e. an article of manufacture, according to the invention. The computer readable media may be, for instance a fixed (hard) drive, disk, diskette, optical disk, magnetic tape, semiconductor memory such as read-only memory (ROM), or any transmitting/receiving medium such as the Internet or other communication network or link. The article of manufacture containing the computer programming code may be made and/or used by executing the code directly from one medium, by copying the code from one medium to another medium, or by transmitting the code over a network.

An apparatus for making, using or selling the invention may be one or more processing systems including, but not limited to, a central processing unit (CPU), memory, storage devices, communication links, communication devices, server, I/O devices, or any sub-components or individual parts of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

Although the present invention has been described in detail with reference to certain preferred embodiments, it should be apparent that modifications and adaptations to those embodiments may occur to persons skilled in the art without departing from the spirit and scope of the present invention as set forth in the following claims.

What is claimed is:

1. A computer implemented method for performing near neighbor database searches comprising:
   a. using a database which represents a large metric space having data items, where each data item in the database represents a point in the large metric space;
   b. selecting data items to form a subset;
   c. designating a data item in the subset as a current data item;
      i. computing a distance between the current data item and at least one other data item in the subset;
      ii. using the computed distances, finding at least one near neighbor data item for the current data item, and creating a link from the current data item to each near neighbor data item;
   d. repeating step c for all data items within the subset.
   e. selecting at least one data item from the subset to form a current search set;
   f. for all data items in the current search set, computing a distance between each data item and a query;

g. computing a distance between the query and a near neighbor data item linked by a data item in the current search set; and h. adding this linked near neighbor data item to the current search set if an addition criterion is met.

2. The method of claim 1 further comprising repeating steps g and h until a search criterion is met.

3. The method of claim 2 further comprising when the search criterion is met, designating an item in the current search set as an approximately nearest neighbor of the query.

4. The method of claim 2 further comprising designating the current search set as a set of approximately nearest neighbors of the query.

5. The method of claim 2 wherein the search criterion is met if all the near neighbor data items linked by all the data items in the current search set fail to meet the addition criterion.

6. The method of claim 3 wherein the item in the current search set with the smallest distance to the query is designated as the approximately nearest neighbor of the query.

7. The method of claim 2 wherein the addition criterion uses the computed distance between the linked near neighbor data item and the query to determine whether to add the linked near neighbor data item to the current search set.

8. The method of claim 2 wherein the addition criterion is met if the computed distance of the linked near neighbor data item to the query is less than the computed distance of at least one other data item in the current search set to the query.

9. The method of claim 2 wherein the addition criterion is deterministic.

10. The method of claim 1 further comprising:
i. selecting a current search item from the data items in the subset;
j. computing a distance between the current search item and a query;
k. for all near neighbor data items linked by the current search item, computing a distance between the query and the near neighbor data item linked by the current search item;
l. for the current search item, selecting one of the near neighbor data items, and if this near neighbor data item is closer to the query than is the current search item, selecting this near neighbor data item as the new current search item and repeating steps k and i; and
m. if the near neighbor data item is not closer to the query than is the current search item, designating the current search item as an approximately nearest neighbor of the query.

11. The method of claim 2 wherein the addition criterion is met if the computed distance of the linked near neighbor data item to the query is less than the computed distances of all other data items in the current search set to the query.

12. The method of claim 1 wherein the subset contains all the data items in the database.

13. The method of claim 1 wherein the distances are computed using a user-defined distance metric.

14. The method of claim 1 wherein determining the near neighbor data items of the current data item comprises computing the distance between the current data item and each data item in the subset and selecting the near neighbor data items which produce a smallest distance.

15. The method of claim 1 wherein a number of near neighbor data items is selected to optimize computational speed of the near neighbor database search.

16. The method of claim 1 wherein a number of near neighbor data items is selected to optimize computational data storage resources used for the near neighbor database search.

17. The method of claim 1 wherein a number of near neighbor data items that are selected is a default value.

18. A computer implemented method for performing near neighbor database searches comprising:
a. using a database which represents a large metric space having data items, where each data item in the database represents a point in the large metric space;
b. designating all the data items in the database as an initial current subset;
c. selecting data items from the current subset to form a new current subset;
d. designating a data item in the current subset as a current data item:
   i. computing a distance between the current data item and at least one other data item in the current subset;
   ii. using the computed distances, finding at least one near neighbor data item for the current data item, and creating a link from the current data item to each near neighbor data item;
e. repeating step d until each data item within the current subset has been designated as the current data item; and
f. repeating steps c through e at least once.

19. The method of claim 18 further comprising:
g. setting the current subset level to a selected subset;
h. selecting at least one data item from the current subset level to form a current search set;
i. for all data items in the current search set, computing a distance between each data item and a query;
j. computing a distance between the query and a near neighbor data item linked by a data item in the current search set;
k. adding this linked near neighbor data item to the current search set if an addition criterion is met; and
l. repeating steps j and k until a search criterion is met.

20. The method of claim 19 wherein the selected subset is the subset containing the smallest number of data items.

21. The method of claim 19 further comprising when the search criterion is met, designating an item in the current search set as an approximately nearest neighbor of the query.

22. The method of claim 19 further comprising designating the current search set as a set of approximately nearest neighbors of the query.

23. The method of claim 19 wherein the search criterion is met if all the near neighbor data items linked by all the data items in the current search set fail to meet the addition criterion.

24. The method of claim 21 wherein the item in the current search set with the smallest distance to the query is designated as the approximately nearest neighbor of the query.

25. The method of claim 19 wherein the addition criterion uses the computed distance between the linked near neighbor data item and the query to determine whether to add the linked near neighbor data item to the current search set.

26. The method of claim 19 wherein the addition criterion is met if the computed distance of the linked near neighbor data item to the query is less than the computed distance of at least one other data item in the current search set to the query.

27. The method of claim 19 wherein the addition criterion is deterministic.

28. The method of claim 19 wherein the addition criterion is probabilistic.

29. The method of claim 28 further comprising a probability of adding one of the near neighbor data items to the current search set that is inversely related to the distance between the query and the near neighbor data item.

30. The method of claim 19 wherein the addition criterion is not met unless the linked near neighbor data item is in the current subset level.

31. The method of claim 19 further comprising:
   m. the addition criterion is not met unless the linked near neighbor data item is in the current subset level;
   n. changing the current subset level to a subset level with a greater number of item; and
   o. repeating steps h through n until a final criterion is met.

32. The method of claim 19 further comprising:
   m. the addition criterion is not met unless the linked near neighbor data item is in the current subset level;
   n. changing the current subset level to a subset level with a greater number of item; and
   o. repeating steps h through n until a user-specified number of subset levels is searched.

33. The method of claim 31 wherein steps h through n are repeated until a default number of subset levels is searched.

34. The method of claim 19 wherein the search criterion is met when a specified amount of processing has occurred.

35. The method of claim 19 wherein the search criterion is met when the item in the current search set closest to the query is within a user-specified distance from the query.

36. The method of claim 19 wherein the search criterion is met when the item in the current search set closest to the query is within a default distance from the query.

37. The method of claim 18 wherein steps c through e are repeated until the number of data items in the current subset is less than or equal to a designated value.

38. The method of claim 18 wherein steps c through e are repeated until every data item in the current subset links to every other data item in the current subset.

39. The method of claim 18 wherein all distances are computed using a same distance metric.

40. The method of claim 39 wherein finding the near neighbors of the current data item comprises computing the distance between the current data item and each data item in the subset and selecting p items which produce a smallest distance.

41. The method of claim 40 wherein p is selected to optimize the computational speed of the near neighbor database search.

42. The method of claim 40 wherein p is selected to optimize the computational data storage resources used for the near neighbor database search.

43. The method of claim 40 wherein p is a predetermined default value.

44. A computer implemented method for finding a data item nearby a query point comprising:
   a. using a database with data items, where each data item in the database represents a point in a large metric space;
   b. creating links between data items that are near neighbors;
   c. selecting a data item to be the current search item;
   d. computing a distance between the current search item and the query point;
   e. computing a near neighbor distance between the query point and a near neighbor item linked by the current search item;
   f. if the near neighbor distance is less than the distance between the current search item and the query point, selecting the near neighbor item as the current search item; and
   g. repeating steps e and f until a search criterion is met.

45. The method of claim 44 wherein the search criterion is met when the smallest distance between any near neighbor items and the query point is greater than the distance between the current search item and the query point.

46. The method of claim 45 further comprising, when the search criterion is met, selecting the current search item as a result.

47. The method of claim 46 wherein the result is an approximately nearest neighbor of the query.

48. The method of claim 46 further comprising saving the result and including the linked near neighbors of the current search item with the result.

49. The method of claim 44 wherein a user-defined distance metric is used to determine the near neighbor items.

50. The method of claim 1 wherein creating a link between data items that are near neighbors comprises creating a link from a data item A to a data item B if A is a nearest neighbor of B.

51. The method of claim 18 wherein creating a link between data items that are near neighbors comprises creating a link from a data item A to a data item B if A is a nearest neighbor of B.

52. The method of claim 44 wherein creating a link between data items that are near neighbors comprises creating a link from a data item A to a data item B if A is a nearest neighbor of B.

53. The method of claim 1 wherein creating a link between data items that are near neighbors comprises creating a link from a data item A to a data item B if B is a nearest neighbor of A.

54. The method of claim 18 wherein creating a link between data items that are near neighbors comprises creating a link from a data item A to a data item B if B is a nearest neighbor of A.

55. The method of claim 44 wherein creating a link between data items that are near neighbors comprises creating a link from a data item A to a data item B if B is a nearest neighbor of A.

56. The method of claim 44 wherein the search criterion is met when the current search item is closer to the query point than are all items to which the current search item links.

57. A computer implemented method for performing near neighbor database searches comprising:
   a. using a database which represents a large metric space having data items, where each data item in the database represents a point in the large metric space;
   b. computing the distance between data items;
   c. storing a link, which is a pointer to another data item, for data items that are near one another;
   d. designating an item to be a current search item;
   e. computing a distance between the current search item and a query point in the large metric space;
   f. computing a distance between the query point and linked items to which the current search item links;
   g. if the distance from the query point to the linked item is less than the distance between the query point and the current search item, designating the linked item as the current search item and repeating steps f and g; and
   h. if the distance from the query point to the linked item is greater than the distance between the query point and the current search item, designating the current search item as a search result.

58. The method of claim 1 further comprising storing a link from a data item A to a data item B if A is a nearest neighbor of data item B.

59. The method of claim 18 further comprising storing a link from a data item A to a data item B if A is a nearest neighbor of data item B.

60. The method of claim 44 further comprising storing a link from a data item A to a data item B if A is a nearest neighbor of data item B.

61. The method of claim 1 further comprising storing a link from a data item A to a data item B if B is a nearest neighbor of data item A.

62. The method of claim 18 further comprising storing a link from a data item A to a data item B if B is a nearest neighbor of data item A.

63. The method of claim 44 further comprising storing a link from a data item A to a data item B if B is a nearest neighbor of data item A.

64. The method of claim 1 wherein the data items in the subset are selected randomly.

65. The method of claim 18 wherein the data items in the subsets are selected randomly.

66. The method of claim 2 wherein the initial current search set is designated by a user.

67. The method of claim 19 wherein the initial current search set is designated by a user.

68. The method of claim 44 wherein an initial current search item is designated by a user.

69. A software program embodied on a computer-readable medium incorporating the method as recited in claim 1.

70. A software program embodied on a computer-readable medium incorporating the method as recited in claim 2.

71. A software program embodied on a computer-readable medium incorporating the method as recited in claim 18.

72. A software program embodied on a computer-readable medium incorporating the method as recited in claim 19.

73. A software program embodied on a computer-readable medium incorporating the method as recited in claim 44.

74. The method of claim 1 wherein all distances are computed using a same distance metric.

75. The method of claim 1, further comprising:
   i. selecting a current search item from the data items in the subset;
   j. computing a distance between the current search item and a query;
   k. for all near neighbor data items linked by the current search item, computing a distance between the query and the near neighbor data item linked by the current search item;
   l. for the current search item, determining the near neighbor data item having the smallest distance to the query, and if this near neighbor data item is closer to the query than is the current search item, selecting this near neighbor data item as the new current search item and repeating steps k and l; and
   m. if the near neighbor data item is not closer to the query than is the current search item, designating the current search item as an approximately nearest neighbor of the query.

76. The method of claim 18, further comprising:
   g. setting the current subset level to a selected subset;
   h. selecting a current search item from the data items in the current subset level;
   i. computing a distance between the current search item and a query;
   j. computing a distance between the query and a near neighbor data item linked by the current search item;
   k. designating this linked near neighbor data item as the current search item if an addition criterion is met; and
   l. repeating steps j and k until a search criterion is met.

77. The method of claim 76 wherein selecting the current subset level comprises selecting a subset containing a smallest number of data items.

78. The method of claim 2 wherein all distances are computed using a same distance metric.

79. The method of claim 19 wherein all distances are computed using a same distance metric.

80. The method of claim 79 wherein the addition criterion is a probabilistic criterion comprising a probability of adding the near neighbor data item that is inversely related to the distance between the query and the near neighbor data item.

81. The method of claim 18 wherein the number of near neighbor data items varies for each data item.

82. The method of claim 18 wherein the number of near neighbor data items is the same for each data item.

83. The method of claim 18 further comprising:
   g. setting the current subset level to the subset containing the smallest number of data items;
   h. selecting a current search item from the data items in the current subset level;
   i. for the current subset level:
      i. computing a distance between the current search item and a query;
      ii. for all near neighbor data items linked by the current search item, computing a distance between the query and the near neighbor data item;
      iii. for the current search item, selecting one of the near neighbor data items, and if this near neighbor data item is closer to the query than is the current search item, selecting this near neighbor data item as the new current search item and repeating steps ii and iii; and
   j. if the near neighbor data item is not closer to the query than is the current search item, designating the current search item as an approximately nearest neighbor of the query for the current subset level; and
   k. changing the current subset level and repeating steps i and j.

84. A computer implemented method for performing near neighbor database searches comprising:
   a. using a database containing data items having links between near neighbor data items;
   b. selecting at least one data item from the database to form a current search set;
   c. for each data item in the current search set, computing a distance between the data item and a query;
   d. computing a distance between the query and a near neighbor data item linked by a data item in the current search set;
   e. adding this linked near neighbor data item to the current search set if an addition criterion is met;
   f. repeating steps d and e until a search criterion is met; and
   g. designating a data item within the current search set as an approximately nearest neighbor of the query.

85. The method of claim 84 further comprising when the search criterion is met, designating an item in the current search set as an approximately nearest neighbor of the query.

86. The method of claim 84 further comprising designating the current search set as a set of approximately nearest neighbors of the query.

87. The method of claim 84 wherein the search criterion is met if all the near neighbor data items linked by all the data items in the current search set fail to meet the addition criterion.

88. The method of claim 84 wherein the item in the current search set with the smallest distance to the query is designated as the approximately nearest neighbor of the query.

89. The method of claim 84 wherein the addition criterion uses the computed distance between the linked near neighbor data item and the query to determine whether to add the linked near neighbor data item to the current search set.

90. The method of claim 84 wherein the addition criterion is met if the computed distance of the linked near neighbor data item to the query is less than the computed distance of at least one other data item in the current search set to the query.

91. The method of claim 84 wherein the addition criterion is deterministic.

92. The method of claim 84 wherein the addition criterion is met if the computed distance of the linked near neighbor data item to the query is less than the computed distances of all other data items in the current search set to the query.

93. A software program embodied on a computer-readable medium incorporating the method as recited in claim 84.

94. The method of claim 1 wherein the distance is computed between the current data item and all the data items in the subset.

95. The method of claim 18 wherein steps c through e are repeated until the number of items in the current subset is less than or equal to a designated value.

96. The method of claim 18 wherein steps c through e are repeated until each item in the current subset has a link to all other items in the current subset.

97. The method of claim 18 wherein steps c through e are repeated at least twice.

\* \* \* \* \*